I. L. FAKE.
PLOW.
APPLICATION FILED JUNE 18, 1910.
976,059.
Patented Nov. 15, 1910.
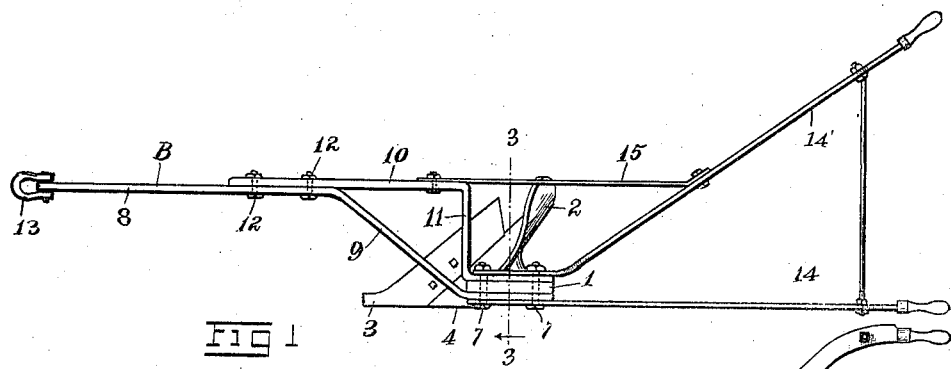
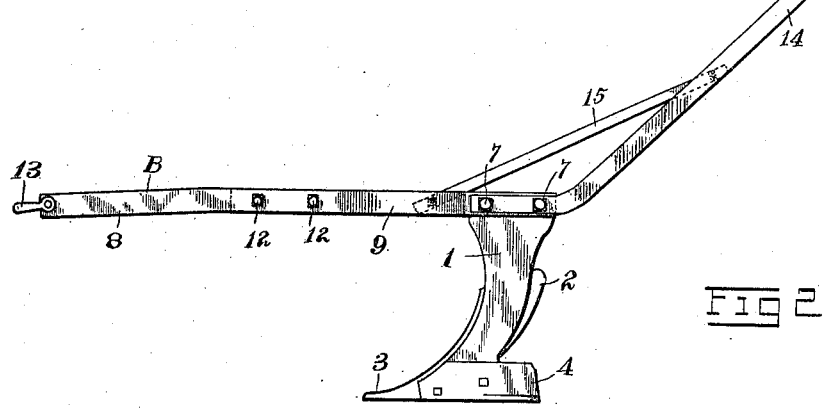
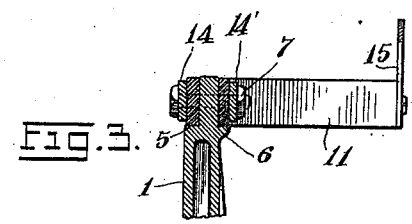
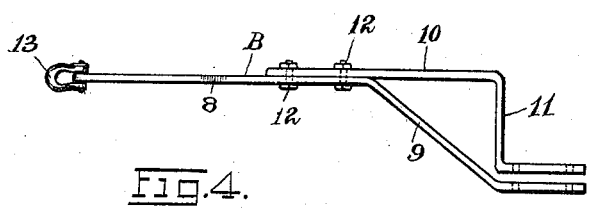
Witnesses
Thos. F. Knox
Wm. Bagger
Inventor
Irving L. Fake
By Victor J. Evans
Attorney
THE NORRIS PETERS CO., WASHINGTON, D. C.

UNITED STATES PATENT OFFICE.

IRVING L. FAKE, OF CANANDAIGUA, NEW YORK.

PLOW.

976,059.  Specification of Letters Patent.  Patented Nov. 15, 1910.

Application filed June 18, 1910. Serial No. 567,657.

*To all whom it may concern:*

Be it known that I, IRVING L. FAKE, a citizen of the United States of America, residing at Canandaigua, in the county of Ontario and State of New York, have invented new and useful Improvements in Plows, of which the following is a specification.

This invention relates to plows, and it has particular reference to that class of plows which are used by wine growers and orchard men for the purpose of plowing close to the vines.

Plows of ordinary construction may not be advantageously used for this purpose, owing to the fact that with the appliances commonly used it is difficult and at times impossible to hold the plow sufficiently close to the vines to effect the desired result, it being impossible with the appliances ordinarily used for the draft animal to walk sufficiently close to the vines to enable the plow to be successfully worked.

The object of the present invention is to produce a plow of simple and improved construction, the beam and handles of which are so constructed and disposed with reference to the plow carrying standard as to enable the draft animal to walk clear of the vines and also to enable the operator to walk at a sufficient distance from the vines and still be able to hold the plow in ground engaging position sufficiently close to the roots of the vines to effect the desired result.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a plow constructed in accordance with the invention. Fig. 2 is a side elevation. Fig. 3 is a transverse sectional detail view taken on the line 3—3 in Fig. 1. Fig. 4 is a plan view of the beam detached.

Corresponding parts in the several figures are denoted by like characters of reference.

The plow standard 1 carrying the mold board 2, share 3 and land-side 4 may be of any suitable well known construction, said standard being preferably formed with a shoulder 5 near its upper end, said shoulder being formed upon the side adjacent to the land. A supporting flange 6 may if desired be formed upon the furrow side of the standard, as shown in Fig. 3 of the drawings.

The standard 1 is provided adjacent to its upper end with apertures for the passage of bolts 7, whereby the beam B is secured in position. Said beam includes a main portion 8 which is provided intermediate its ends with an obliquely disposed offset 9 so that the front and rear terminals of said main portion will be disposed in approximately parallel relation. The beam also includes a brace portion 10 having intermediate its ends an offset 11 which is formed approximately at right angles to the front and rear ends of said brace portion which will thus be disposed in approximately parallel relation. The rear ends of the members constituting the beam are supported upon the shoulders 5 and 6 and are apertured for the passage of the bolts 7 whereby the beam is connected with the standard. The front ends of the members 8 and 10, that is to say, the portions extending forwardly of the offset portions 9 and 11, are permanently connected together by fastening members such as bolts or rivets 12. The beam carries at its forward extremity a clevis 13 for the attachment of the draft.

It will be observed that the offset portions 9 and 11 of the members constituting the beam are so proportioned that the forward portion of the beam shall be offset toward the furrow side of the plow sufficiently to afford ample clearance for the draft animal as well as the operator with respect to the vines adjacent to the roots of which the furrow is being made.

The handles 14 and 14′ are secured upon the bolts 7 by means of which the beam is connected with the standard, both of said handles being upturned to afford a convenient grasp for the operator. The handle 14 is disposed approximately in the vertical plane on the land-side of the plow, but the handle 14′ is bent or offset laterally in the direction of the furrow side, said handle 14' being also connected with the brace member 10 of the beam by means of a brace 15. A round 16 connects the handles together in the usual manner.

As will be seen from the foregoing description, taken in connection with the drawings hereto annexed, I have provided a plow of extremely simple construction which is both light and durable and fully able to resist any strain to which it may be subjected. It will also be obvious that the operator with this plow is enabled to plow very close to the roots of grape and other vines without being impeded by the overhanging branches and without danger of injuring the latter. The plow, in actual practice, has proven to be thoroughly efficient for the purposes for which it is provided.

Having thus described the invention, what is claimed as new, is:—

1. In a plow of the character described, a standard having a shoulder adjacent to its upper end, and a beam supported upon said shoulder and secured to the standard; said beam including a body portion and a brace portion each having an intermediate offset portion whereby the front and rear ends of said body portion and brace portion are disposed in parallel relation; the rear ends of the body portion and the brace portion lying adjacent to opposite sides of the standard, and the front ends of said body portion and brace portion lying closely together; and means whereby said front ends are connected together.

2. In a plow of the character described, a standard shouldered adjacent to its upper end, a beam comprising a body portion and a brace portion lying adjacent to opposite sides of the standard, said body member being provided intermediate its ends with an obliquely offset portion and said brace member being provided intermediate its ends with a right angular offset portion, means for connecting the portions of the body member and the brace member lying in front of the intermediate portions, handles supported adjacent to the members constituting the beam, one of said handles being offset in the direction of the offset portion of the beam, and a brace connecting said offset handle with the offset portion of the beam.

In testimony whereof I affix my signature in presence of two witnesses.

IRVING L. FAKE.

Witnesses:
 WM. BAGGER,
 D. W. GOULD.